Aug. 19, 1941.  W. J. BIRCH  2,253,013
AIRPLANE PROPELLER
Filed Aug. 21, 1939
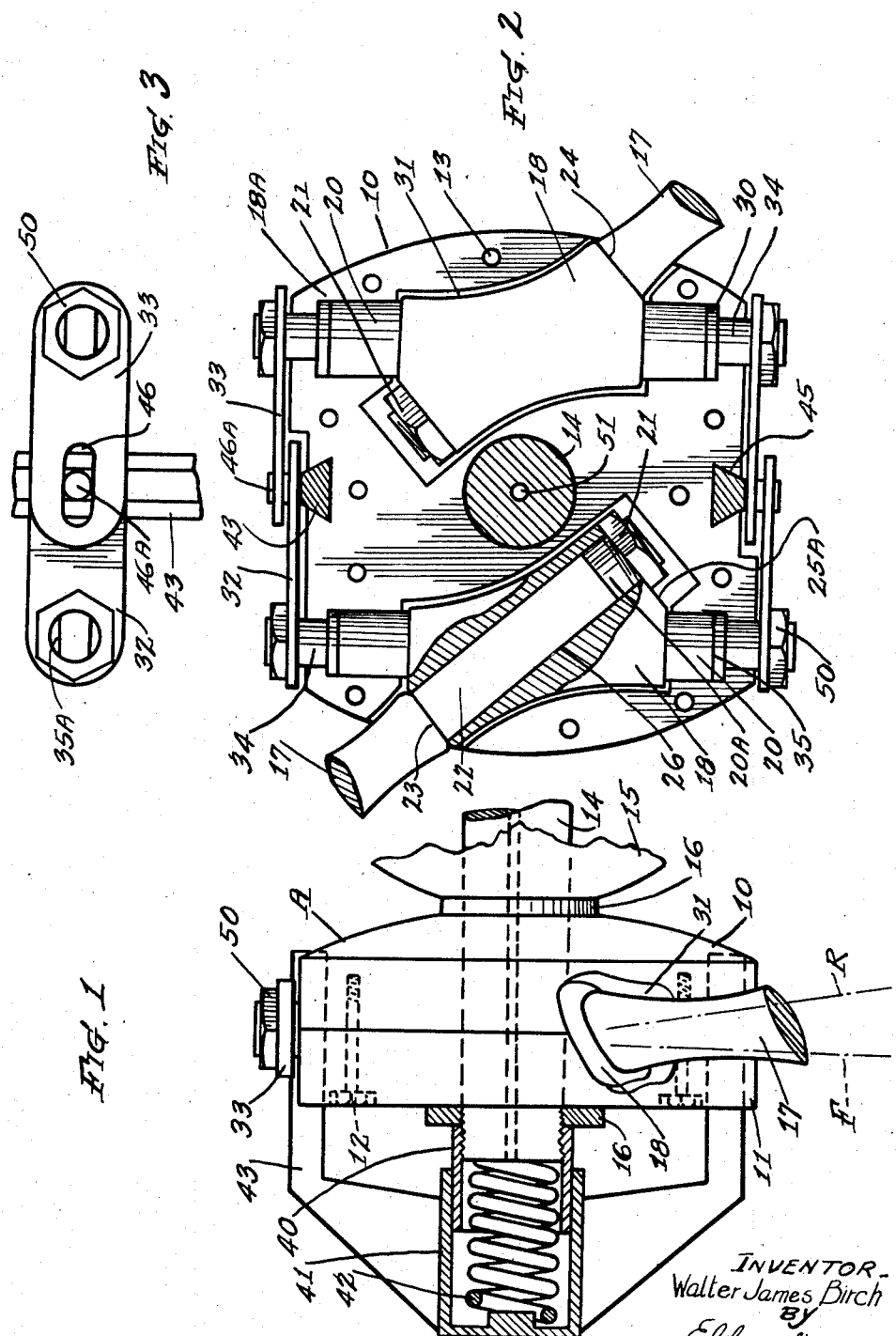
INVENTOR-
Walter James Birch
BY
E.L.Gowling
ATTORNEY.

Patented Aug. 19, 1941

2,253,013

UNITED STATES PATENT OFFICE 2,253,013

AIRPLANE PROPELLER

Walter James Birch, Winnipeg, Manitoba, Canada

Application August 21, 1939, Serial No. 291,172
In Canada July 11, 1939

3 Claims. (Cl. 170—162)

My invention relates to thrust-controlled variable pitch airplane propellers.

An object of the invention is to so mount a propeller blade that it will be rotated, not on its longitudinal axis, but bodily on an axis spaced from the tip thereof so as to move the tip in an arc of a circle having said axis as its centre, to thus increase or decrease the effective pitch of the blade.

Another object is to so mount the blade and to provide such means that the pitch of the blade will be automatically adjusted as a function of the thrust imposed upon the blade.

Other objects and advantages of my improved propeller may be appreciated by perusing the specification in the light of the drawing.

In the drawing, wherein like numerals of reference indicate corresponding parts in the various figures—

Figure 1 is a side elevation, partly in section, of a propeller made in accordance with my invention;

Figure 2 is an inside elevation of the rear half of the housing, with propellers partly broken away, part of one of the propeller hub sockets being shown in section;

Figure 3 is a top plan view of Figure 1, but with parts omitted, more particularly showing arrangement of operating levers and actuating rod.

Referring now to the drawing, the propeller housing A is made of two complementary parts 10 and 11, 10 being the rear part and 11 the forward part. The two parts are secured in operative or assembled relationship by a plurality of machine screws 12 inserted through the forward part 11 and threaded into threaded holes 13 in the rear part 10.

The housing complete, that is both parts 10 and 11 as assembled together, is mounted on the propeller shaft 14, which as usual projects forwardly through the forward end of the fusilage 15 (shown in part only), and secured thereto by nuts 16 threaded on the shaft forwardly and rearwardly of the housing complete.

The blades 17, two in number, are mounted at their inner ends in two members or hubs 18. The hub 18 is formed with trunnions or pivots 20 arranged in an axis which lies at an angle to the longitudinal axis of the blade, and the trunnions are so mounted in the housing complete as to be rotatable. Both hub sockets have their axes in parallelism, and in a plane at right angles to the axis of the shaft 14.

The inner end portion 22 of the blade, which is preferably non-circular in cross-section, is inserted into an elongated, similarly cross-sectioned bore or cavity 26 provided through the particular hub socket 18 in the longitudinal axis of the blade. On the inner end of the portion 22 of the blade is frozen or otherwise rigidly secured a circular metal collar 20A which is threaded to receive a nut 21.

The blade may be reduced in size to provide a shoulder 23 adapted to engage against the outer end or face 24 of the hub socket, so that by tightening the nut 21 against the end face 25A of the hub socket, the blade will be drawn home in the bore 26, and the blade will thus be suitably secured or anchored in operative position in its associated hub socket 18.

The complementary parts 10—11 of the housing complete are formed with similarly-formed, semi-circular recesses 18A, to provide suitable bearings or journals for the trunnions or pivots 20 of the blade hub sockets. The trunnions are reduced in diameter to form shoulders 35 spaced from the end walls of the parts 10—11 and thus provide spaces for suitable thrust bearings, say in the form of ball bearings 30. Obviously, the parts 10—11 are also provided with recesses or cavities 31 adapted to accommodate the blade hub sockets and to permit of their moving or rotating bodily on their axes, that is, on the axes of the pivots 20.

The outer ends of the pivots project through the propeller housing to fixedly receive levers 32 and 33, the levers overlapping at their outer or free ends. The end of the pivot, or more particularly the reduced portion 34 lying outwardly of the housing, may be planed longitudinally to provide two spaced flat faces 35A, the planed reduced portion so formed receiving the appropriately slotted end of the lever 32, or 33, as the case may be, so that the blade hub sockets may be rotated on the axes of their respective pivots, by turning the respective levers.

Fixed to the forward end of the propeller shaft 14 is a sleeve 40, the sleeve being preferably threaded to the shaft and bearing against the forward nut 16. The sleeve may extend forwardly farther than the end of the shaft. Slidably mounted on the sleeve 40 is a hollow member or cylinder 41, and within the cylinder, and between the end of the propeller shaft and the end wall of the cylinder, is a tensioned helical spring 42.

From the peripheral wall of the cylinder extend two diametrically-disposed rods 43, the rods being directed rearwardly to slide in slots 45 formed in the parts 10—11 of the housing. The levers 32 and 33, where they overlap one another, are each formed with an elongated slot 46 adapted to receive a pin 46A fixed to the associated rod 43, so that both levers on the opposite sides of the housing A will be simultaneously rotated by the action of the cylinder as it moves or shifts upon the sleeve. Similarly, both hub sockets will be rotated bodily on the axes of their pivots, respectively, by the same action of the cylinder. Conveniently, the cross section of the rods 43 may be as shown in Figure 2, and the slots 45 correspondingly made. The levers may be secured in place by suitable nuts 50.

It will be seen that as the blades are fixed in the hub sockets 18, and these are mounted to rotate on the axes of the pivots 20, the pitch of the blades will be varied not by rotating on their longitudinal axes but by being rotated bodily on the axes of the pivots 20. The blades are set at a suitable angle, laterally with respect to their longitudinal axes, and the low pitch of the blades intended to be determined by the forwardmost position of the tips of the blades, as suggested by the dot and dash line shown at F in Figure 1. This forwardmost position of the blade is thus determined by the engagement of the hub socket with one wall of the hub cavity or recess; similarly, the high pitch position of the blade, as suggested by the dot and dash line shown at R in Figure 1, is determined by the engagement of the hub socket with the other or opposite wall of the cavity or recess.

The tension in the spring must be such that when the propeller is idle, the blades assume their high pitch position, but upon the engine attaining its full operating speed, the blades will be acted upon by aerodynamic force and centrifugal force on the blades and will assume their low pitch position, the spring being compressed to its maximum. As the density of the air travelled through decreases, the spring will gradually shift the cylinder forwardly and therefore gradually alter the position of the blades until they reach their intended, or predetermined high pitch position.

If preferred, the oil pressure system of the engine may be made to assist the action of the spring, or utilized without the use of such spring. A bore or channel 51 made through the centre of the propeller shaft and operatively communicating with the oil system would bring oil, under pressure, into the cylinder.

It will be seen that the propeller could be used with the well-known Hamilton standard governor and booster pump, to function as a constant speed propeller. As is known, constant speed of engine in an airplane is desirable for safety, efficiency and economy. For instance, the engine tends to race when in a power dive, or in ordinary descent, so that the governor automatically increases the pitch to the extent required to retain the pre-arranged speed to which the pilot had set the governor. As is known, such governor is adjustable from the pilot's seat to function at any speed within certain limits of manifold pressure and rated R. P. M. of the particular engine manufacturer.

It is to be understood that modifications to the embodiment of the invention as shown may be made, without departing from the spirit and scope of the invention as claimed.

Having regard to the foregoing disclosure, the patent of which this specification forms part confers, subject to the conditions prescribed in the patent act, 1935, the exclusive right, privilege and liberty of making, constructing, using and vending to others to be used, the invention as defined in claims submitted by the patentee as follows.

I claim:

1. In a variable pitch propeller for an airplane having a driving shaft, a housing fixed to the shaft, at least two members pivotally mounted in said housing and providing parallel axes lying in a plane at right angles to the axis of the shaft, a blade secured to each of said members, superposed parallel levers secured at one end to said members, respectively, and overlapping at their other ends, a plunger slidably mounted to said housing in the axis of the shaft, said plunger having a rigid arm slidably mounted in said housing and extending parallelly with the axis of the shaft to the overlapping ends of said levers, and pivotally connected thereto whereby said levers may be actuated simultaneously by said arm to rotate said members and the blades fixed thereto by the axial movement of said plunger, and a spring between said plunger and said housing yieldingly resisting the axial movement of said plunger in one direction.

2. In a variable pitch propeller for an airplane having a driving shaft formed with an axial bore in operative communication with the oil system of the airplane, a housing fixed to the shaft, a pair of members pivotally mounted in said housing and providing parallel axes lying in a plane at right angles to the axis of the shaft, a blade secured to each of said members, superposed parallel levers secured at one end to said members, respectively, and overlapping at their other ends, a sleeve turning with said housing and forming an extension for the shaft, a cylinder slidably mounted on said sleeve and forming therewith a chamber in operative communication with the bore in the shaft, said cylinder having a rigid arm slidably mounted on said housing and extending parallelly with the axis of the shaft to the overlapping ends of said levers and pivotally connected thereto whereby said levers may be simultaneously actuated by said arm to rotate said members and the blades fixed thereto by the axial movement of said cylinder on said sleeve, and a spring tensioned between said housing and said cylinder yieldingly resisting the axial movement of said cylinder in one direction.

3. In a variable pitch propeller for an airplane having a driving shaft, a housing fixed to the shaft, a pair of members pivotally mounted in said housing and providing parallel axes, one on each side of the shaft, lying in a plane at right angles to the axis of the shaft, said members projecting beyond opposite parallel faces of said housing, a pair of superposed parallel levers adjacent each of said opposite faces, secured at one end to said members, respectively, and overlapping at their other ends, a sleeve in the axis of the shaft secured to said housing on the face thereof which is remote from the airplane nose, a cylinder slidably mounted on said sleeve for axial movement in the axis of said sleeve, said cylinder having two rigid parallel arms slidably mounted in said opposite faces and pivotally connected to the overlapping ends of said levers whereby said levers may be simultaneously actuated to turn said members and the blades fixed thereto by the axial movement of said cylinder on said sleeve, and a coil spring housed within said cylinder and tensioned between said cylinder and said housing to yieldingly resist the axial movement of said cylinder in one direction.

WALTER J. BIRCH.